United States Patent [19]

Ermarcora

[11] Patent Number: 4,991,383
[45] Date of Patent: Feb. 12, 1991

[54] AGRICULTURAL HARVESTING MACHINE MOVABLE INTO TWO POSITIONS

[75] Inventor: Rino Ermarcora, Saverne, France
[73] Assignee: Kuhn S.A., Saverne, France
[21] Appl. No.: 319,161
[22] Filed: Mar. 6, 1989

[30] Foreign Application Priority Data

Apr. 3, 1988 [FR] France .................. 88 02999

[51] Int. Cl.$^5$ .......................................... A01D 75/14
[52] U.S. Cl. ..................... 56/14.9; 56/14.5; 56/15.2; 56/192
[58] Field of Search ............. 56/14.9, 192, 228, 13.6, 56/6, DIG. 1, 15.2, 15.9, 341, 14.5

[56] References Cited

U.S. PATENT DOCUMENTS

| | | |
|---|---|---|
| 2,974,469 | 3/1961 | Smith et al. |
| 3,059,403 | 10/1962 | Bamford et al. ............... 56/192 X |
| 3,221,484 | 12/1965 | Van Der Lely .................. 56/192 X |
| 3,267,652 | 8/1966 | Dahlgren et al. ..................... 56/6 |
| 3,596,445 | 8/1971 | Gaanderen et al. ........... 56/DIG. 1 |
| 3,676,988 | 7/1972 | Hauser-Lienhard ............ 56/192 X |
| 4,555,897 | 12/1985 | Degelman ........................... 56/228 |
| 4,573,309 | 3/1986 | Patterson ...................... 56/14.9 X |
| 4,590,751 | 5/1986 | Stephenson .......................... 56/192 |
| 4,682,462 | 7/1987 | Johnson, Sr. .................. 56/14.9 X |
| 4,685,282 | 8/1987 | Allen ............................... 56/14.9 X |
| 4,739,610 | 4/1988 | Schultz ............................ 56/192 X |

FOREIGN PATENT DOCUMENTS

| | | |
|---|---|---|
| 0188682 | 7/1986 | European Pat. Off. |
| 0223302 | 11/1986 | European Pat. Off. |
| 1582350 | 7/1971 | Fed. Rep. of Germany . |
| 1782826 | 8/1974 | Fed. Rep. of Germany . |
| 2524348 | 12/1976 | Fed. Rep. of Germany . |
| 8625852 | 2/1987 | Fed. Rep. of Germany . |
| 2110011 | 6/1972 | France . |

Primary Examiner—Hoang C. Dang
Attorney, Agent, or Firm—Oblon, Spivak, McClelland, Maier & Neustadt

[57] ABSTRACT

An agricultural machine for harvesting crop includes a frame provided with a tongue and carrying wheels. The frame carries a cutting device, a conditioning and/or throwing device and adjustable deflectors. The cutting device and the conditioning and/or throwing device can be transposed into a second work position in which they form an acute first angle with a straight line perpendicular to direction of advance and acute second angles with axes of carrying wheels. The second angles have approximately the same value as the first angle.

13 Claims, 5 Drawing Sheets

AGRICULTURAL HARVESTING MACHINE MOVABLE INTO TWO POSITIONS

BACKGROUND OF THE INVENTION

1. Field of the Invention

This invention relates to an agricultural machine for harvesting crop, comprising a frame provided with a tongue for hitching to a tractor, and carrying wheels which move over the ground alongside the tractor during the work, the frame carrying a cutting device and a conditioning and/or throwing device, as well as adjusting deflectors located on its back side.

2. Background of the Related Art

A known machine of this type can occupy a work position in which the cutting device and conditioning and throwing device are perpendicular to the direction of advance and the deflectors are adjusted so that the crop is gathered and falls on the ground approximately on the right side—viewed in the direction of advance—of the width of the cutting pass.

At the next passage, the position of the deflectors is modified so that the gathered crop falls on the ground approximately on the left side of the width of the cutting pass.

With such an arrangement, the windrows formed in two successive passages are brought together. This arrangement, applied to a machine with great work width, still does not make it possible to gather two windrows, so they form only one windrow of a reduced width, able to be gathered with standard pick-ups of the most up-to-date forage harvesters.

On the other hand, on this machine, the frame with the cutting device and conditioning and/or acceleration device is farther away from the tractor during the second passage to keep its wheels from crushing the hay cut during the first passage. Consequently, the tractor driver must modify his guide marks at each passage.

Further, when the machine is farther away from the tractor, it has more of a tendency to shift toward the back side of the tractor. For this reason, the work width is very irregular and the driver must constantly correct the path.

Finally, when the machine is in the position farthest from the axis of the tractor, its center of gravity is close to the front side of the support triangle defined by its two carrying wheels and the point of hitching the tongue to the tractor. The stability of the machine consequently is precarious in this position.

SUMMARY OF THE INVENTION

This invention has as an object to remedy said drawbacks.

A further object is to make it possible in a simple way to bring the crop deposited during two successive passages closer together.

Yet a further object is to make the driver's work easier and preserve a good stability of the machine during each passage.

For carrying out the above and other objects an important characteristic of the invention consists in the fact that the machine can be transposed from its first work position into a second work position in which the cutting device and the conditioning and/or throwing device form an acute angle with a straight line perpendicular to the direction of advance and acute angles with the axes of the carrying wheels which have approximately the same value as the angle.

More particularly, the agricultural harvesting machine according to the invention includes a frame provided with a tongue for hitching the machine to a tractor; ground engaging wheels mounted on the frame for carrying the machine; cutting means, and conditioning and/or throwing means, mounted on the frame; adjustable deflector means disposed at the rear side of the frame; and transposition means for positively moving the machine from a first work position in which the cutting means and the conditioning and/or throwing means are disposed substantially perpendicular to the direction of advance to a second work position in which the cutting means and the conditioning and/or throwing means form a first acute angle with a straight line perpendicular to the direction of advance and second angles with the axes of said ground engaging wheels, the second angles having substantially the same value as the first angle.

According to this arrangement, during the second passage, the crop is ejected obliquely toward the side where the crop of the preceding passage is located. The lateral movement of the crop is thus no longer assured only by the deflectors. Because of this oblique throwing, the movement obtained is much greater. The crop thus can be partially moved beyond the cutting width to bring it closer to the crop deposited during the preceding passage. Further, the risk of accumulation and packing at the level of the deflectors is considerably reduced.

On the other hand, the claimed characteristic makes it possible to keep the same lateral spacing constant—viewed in the direction of advance—between the tractor and the machine. As a result, the tractor can move, during each passage, close to the crop still standing and the machine does not have too much of a tendency to shift toward the back side of the tractor.

In this second position, the center of gravity of the machine is moved toward the rear with the cutting device and conditioning and/or throwing device. It thus correctly remains inside the support triangle of the machine. The latter therefore also preserves a good stability in its second work position.

The machine according to the invention advantageously comprises transposition means consisting of hydraulic cylinders acting simultaneously on the frame with cutting device and conditioning and/or throwing device and on the supports of carrying wheels. The deflectors located back of the frame can also be hydraulically adjusted, simultaneously with the frame and carrying wheels.

According to another characteristic of the invention, the conditioning and throwing device is made up of a conditioning rotor and a throwing rotor approximately horizontal which extend practically over the entire width of the cutting device. These two rotors can thus condition and eject all the cut crop uniformly.

According to another characteristic of the invention, the throwing rotor comprises on its periphery, teeth curved in the direction opposite its direction of rotation. These teeth penetrate partially into the path of the flails of the conditioning rotor. Said teeth thus act like rakes and intercept all the conditioned crop. Consequently there is no loss of crop between the two rotors. The device according to the invention therefore performs very good quality windrow work.

It is also advantageous for the throwing rotor to be driven in rotation at a higher speed than that of the conditioning rotor. Thus, it causes an acceleration of the crop to obtain a great movement of the latter.

BRIEF DESCRIPTION OF THE DRAWINGS

Other characteristics and advantages of the invention will be apparent from the following description of a non-limiting example of an embodiment of the invention, with reference to the accompanying drawing in which.

DETAILED DESCRIPTION OF THE PREFERRED EMBODIMENTS

As it is represented in FIGS. 1-4, the machine according to the invention comprises a frame (1) exhibiting a horizontal beam (2) with a descending beam (3, 4) at each of its ends. The horizontal beam (2) comprises a projecting section (5), to which is pivoted a tongue (6) by means of a practically vertical pin (7). The front end of this tongue (6) can be connected to a tractor (8) used to move the machine in direction (A) and to drive it during work.

A hydraulic cylinder (9) is pivoted to the tongue (6) and to section (5) of frame (1) by means of pins (10 and 11). Advantageously it is double-acting and is connected to the hydraulic outlet of the tractor. Operation of this cylinder (9) makes it possible to modify the position of frame (1) relative to tongue (6). A device (12) is also provided between the latter and frame (1) making it possible to define the position of the frame relative to tongue (6). As it comes out particularly from FIG. 4, this device (12) consists of a rod (13) sliding in a slide (14) and a lock (15). Rod (13) is pivoted to frame (1) by a pin (16) and comprises an oblong orifice (17) and a cylindrical hole (18). Slide (14) is pivoted to tongue (6) by a pin (19). This slide (14) consists of two superposed flats between which rod (13) can move. In addition, the two flats are connected over a part of their length by two lateral walls (20), to form a guide sleeve for rod (13). A lock (15) is pivoted to these two walls (20) by a horizontal pin (21). It exhibits a control element (22) to which is connected a control cable (23) extending to the driver's station. In addition, it exhibits a slide bolt (24) which is directed downward and extends either into oblong orifice (17) or into cylindrical hole (18) of rod (13). A return spring (25) pulls on lock (15) to keep slide bolt (24) in the orifices provided in rod (13). Hinge pins (16 and 19) of this device (12) are advantageously aligned with hinge pins (10 and 11) of hydraulic cylinder (9).

An arm (26, 27) is pivoted to each lateral leg (3 and 4) of frame (1) by an approximately horizontal pin (28, 29). These arms (26, 27) are directed toward the rear and comprise pivots (30, 31) pivoted by approximately vertical pins (32, 33) (see FIG. 3). Each of these pivots (30, 31) comprises a journal (34, 35) on which is mounted a carrying wheel (36,37) to be able to revolve around an approximately horizontal axis (38, 39). These two wheels (36, 37) move over the ground and carry the machine. They are located behind frame (1) and are separated from one another so that the center of gravity of the machine is correctly located inside the support triangle formed by these two wheels (36, 37) and the support point of tongue (6) on tractor (8). A hydraulic cylinder (40, 41), operated from the tractor, is provided between each of these arms (26, 27) and frame (1). These cylinders (40, 41) make it possible to move arms (26 and 27) around their hinge pins (28 and 29) on frame (1) to modify the position of the latter relative to the ground.

In addition, pivots (30, 31), which carry wheels (36, 37), are connected to arms (26, 27) by double-action hydraulic cylinders (42, 43), fed and controlled from tractor (8). These cylinders (42, 43) are placed on the side of arms (26 and 27). They are pivoted, by approximately vertical pins (44), to lugs (45) integral with arms (26, 27) and, by also approximately vertical pins (46), to lugs (47) integral with pivots (30, 31). Operation of these cylinders (42, 43) makes it possible to modify the position of carrying wheels (36, 37) relative to frame (1) of the machine. The length of rod (48) of each of these cylinders (42, 43) is advantageously adjustable to be able to determine with precision the position of pivots (30, 31) and of carrying wheels (36, 37). For this purpose, rod (48) comprises, at its end, a tip (49) through which hinge pin (46) passes. This tip (49) is screwed onto the end of rod (48) which is provided with a thread. By turning the rod on itself, its penetration into tip (49) can be modified. Locking between these two parts is assured by a lock nut. By this operation, the distance between the two hinge pins (44 and 46) of hydraulic cylinder (42, 43) is modified. The position of carrying wheels (36, 37) could also be defined by adjustable stops provided between arms (26, 27) and their pivots (30, 31).

Figure 5:
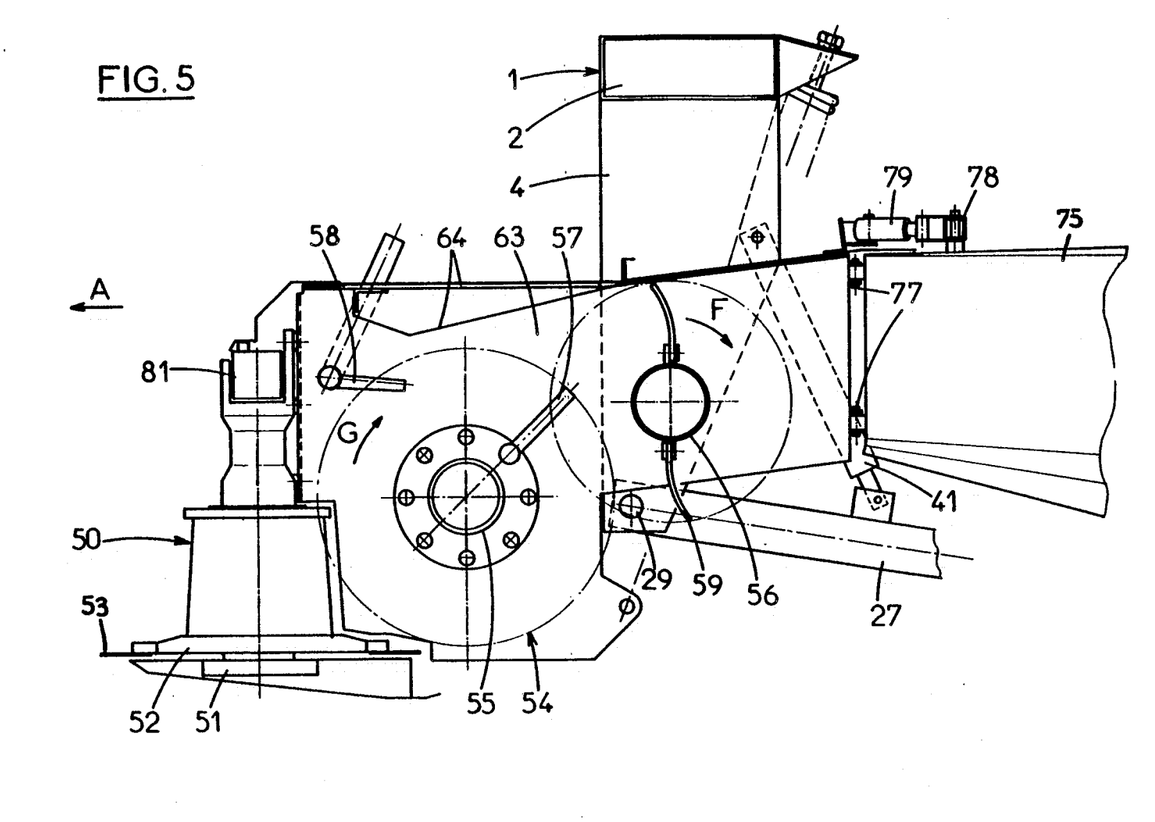
FIG. 5 is a section along plane V—V of FIG. 1.

Further, frame (1) carries a cutting device (50) comprising a housing (51), elongated in shape, carrying several disks (52) provided with blades (53). The housing contains transmission means assuring driving in rotation of disks (52) for cutting crop. The frame (1) also carries a conditioning and throwing device (54) located behind cutting device (50). It is farther from the ground than the cutting device (50) as seen in FIG. 5. It consists of a conditioning rotor (55) and a throwing rotor (56). Conditioning rotor (55) is placed horizontally and extends practically over the entire width of cutting device (50). Its periphery is provided with pivoted flails (57) which can work with stationary pins (58). Throwing rotor (56) is located in the immediate vicinity behind conditioning rotor (55). It is approximately parallel to the latter and extends practically over the entire width of cutting device (50). Its periphery is equipped with spring steel teeth (59). These teeth are placed in lines and are slightly curved in the direction opposite to direction of rotation (F) of rotor (56) (see FIG. 5).

The two rotors (55 and 56) are housed at each of their ends in bearings (60 and 61) to be able to revolve around their respective longitudinal axes. These bearings (60 and 61) are themselves fastened to lateral flanges (62 and 63) connected to frame (1). Two flanges (62 and 63) are connected to one another by a cap (64) which covers two rotors (55 and 56). This cap (64) has not been represented in FIGS. 1 and 2 to preserve their clarity. A transmission housing (65) is connected to left flange (62)—viewed in direction of advance (A). This housing (65) comprises input shaft (66), which is connected to the power takeoff shaft of the tractor by cardan shafts. It also comprises a first output shaft which extends downward into housing (51) to drive disks (52) in rotation and a second output shaft (67) carrying a pulley (68). The latter is connected by belts (69) to another pulley (70) provided at the end of conditioning rotor (55) and drives the latter in rotation in the direction of arrow (G) in FIG. 5. This rotor also comprises at its other end a pulley (71) which belts (72) go over. They also go over a pulley (73) provided at the end of throwing rotor (56) to drive the latter in the direction of arrow (F). The diameter of pulley (73) of throwing rotor (56) is less than that of driving pulley (71) so that the speed of rotation of throwing rotor (56) is greater than that of conditioning rotor (55). These two rotors (55 and 56) rotate in the same direction (arrows F and G in FIG. 5).

A deflector (74 and 75), in the shape of an essentially rectangular panel, is pivoted to each flange (62 and 63). These pivotings are achieved by approximately vertical pins (76 and 77). These deflectors (74 and 75) in practice constitute extensions of said flanges. They can be moved and stopped in different positions. As comes out particularly from FIGS. 1 and 2, the two deflectors (74 and 75) are connected to one another by a rod (78). A double-action hydraulic cylinder (79) is pivoted both to this rod (78) and cap (64). The hydraulic cylinder (79) is fed and operated from the tractor. It makes it possible to modify the position of the two deflectors (74 and 75).

The hydraulic cylinder (79) which moves deflectors (74 and 75), hydraulic cylinders (42 and 43) which move carrying wheels (36 and 37), and hydraulic cylinder (9) which moves frame (1) relative to tongue (6) are connected together by hydraulic lines so that they can be operated simultaneously.

Cutting device (50) can be surrounded by a protector (80) with a metal reinforcement. It is carried by a tube (81) which is placed above cutting device (50) and which also reinforces the latter.

During the work, the machine projects laterally beyond tractor (8) and is drawn in direction (A). Disks (52) are then driven in rotation and cut the crop (for example, grass) which is still standing. This crop is then snapped up by flails (57) of conditioning rotor (55) which make the film that encloses the stem explode to accelerate further drying. The crop thus conditioned arrives at the throwing rotor (56) which propels it toward the rear between the two deflectors (74 and 75).

Figure 1:
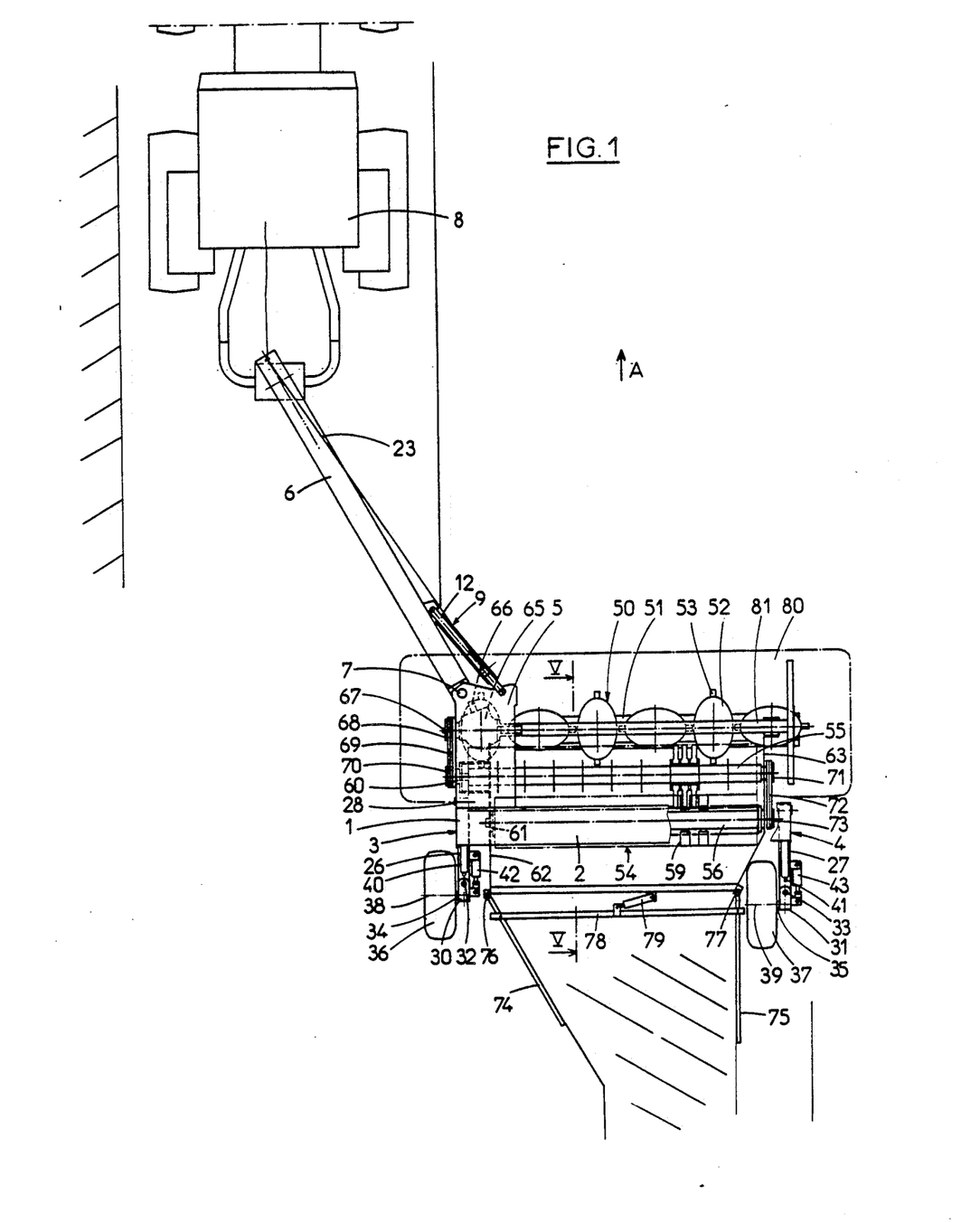
FIG. 1 represents a top view of a machine according to the invention in the first work position.

In the first work position which is represented in FIG. 1, cutting device (50) and conditioning and throwing device (54) are approximately perpendicular to direction of advance (A). Frame (1) and the devices (50 and 54) are stopped in this position by hydraulic cylinder (9) connecting frame (1) and tongue (6) and by position definition device (12). Sliding bolt (24) of lock (15) of this device (12) is then resting against one of the ends of oblong orifice (17). In this position, axes (38 and 39) of the two wheels (36 and 37) which carry the machine are approximately parallel with devices (50 and 54), respectively, for cutting and conditioning and throwing. Further, the two deflectors (74 and 75) are adjusted so that deflector (75), located on the right side—viewed in direction of advance (A)—is practically parallel to this direction of advance (A) and so that deflector (74) located on the left side is directed obliquely toward the right side. The crop coming from conditioning and throwing device (54) is thus gathered and directed toward the right side of the cutting pass by deflectors (74 and 75). It then falls on the ground in the form of a well-aerated and well structured windrow.

Figure 2:
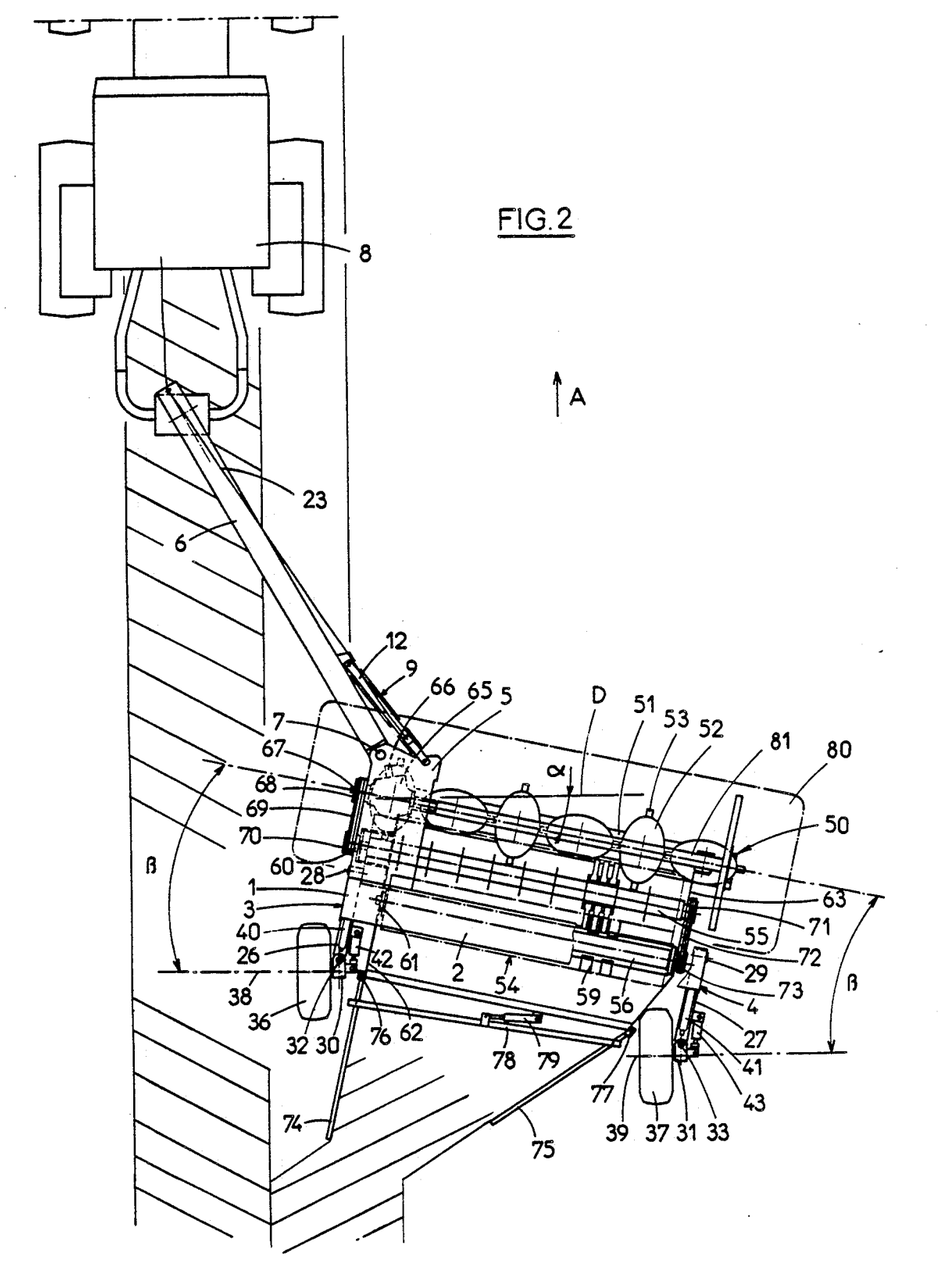
FIG. 2 represents a top view of the machine in the second work position.
Figure 3:
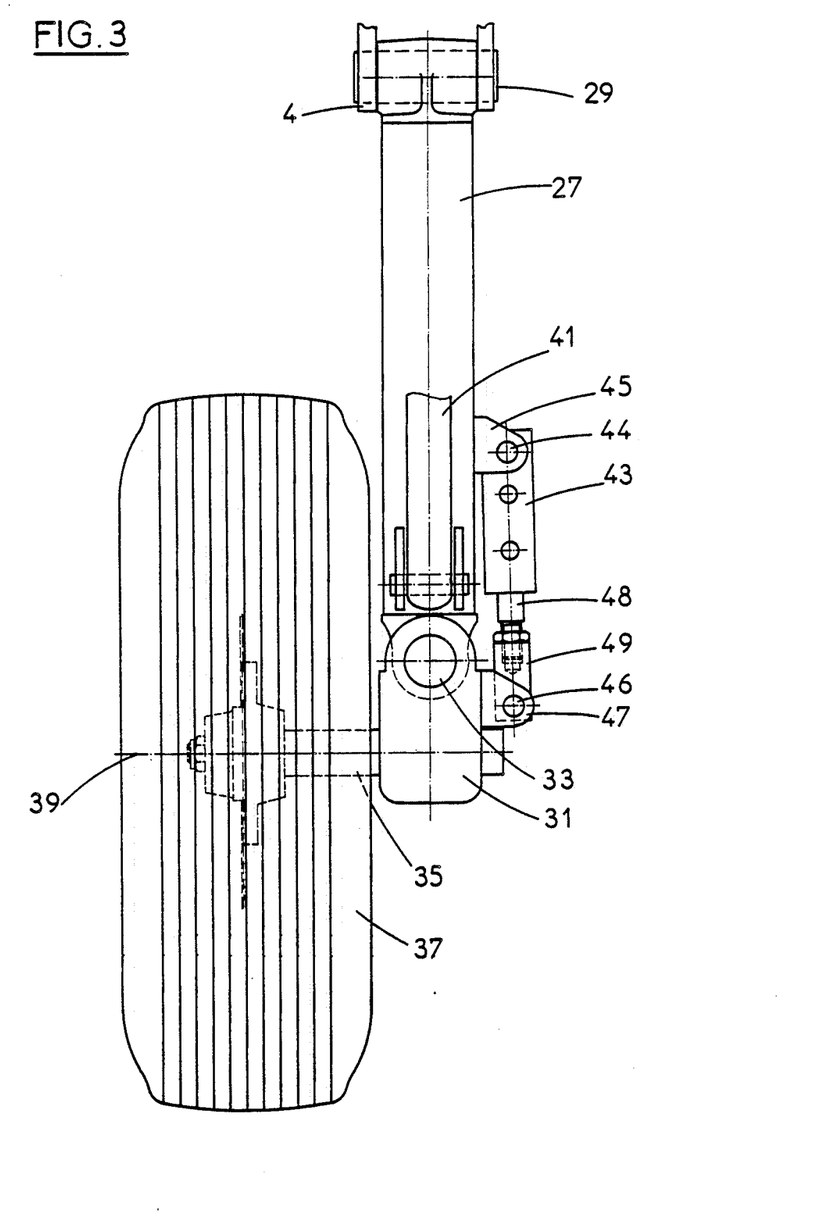
FIG. 3 represents a detail view of the assembly of a carrying wheel.
Figure 4:
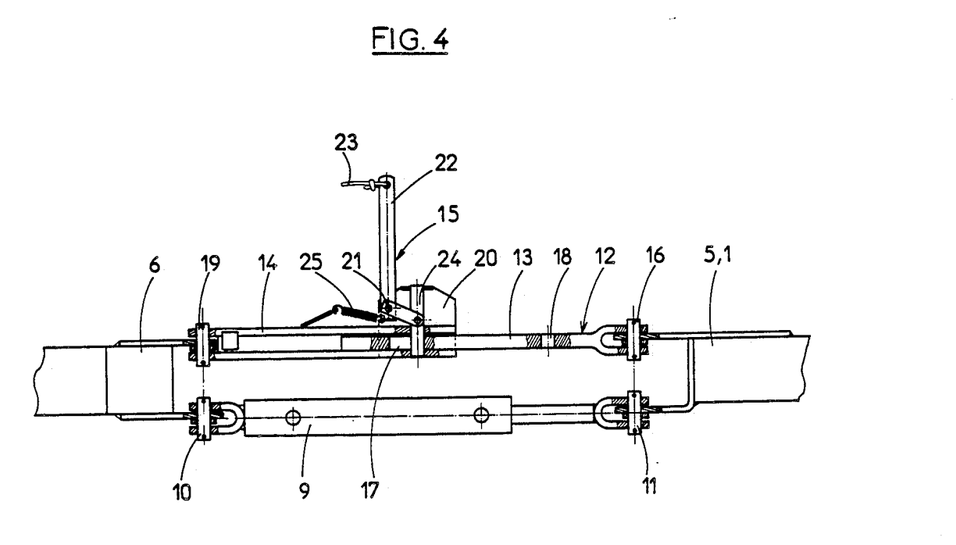
FIG. 4 represents a detail view of the device making it possible to define the positions of the machine.

For the following passage, the machine is brought into the second work position represented in FIG. 2. In this position, cutting device (50) and conditioning and throwing device (54) form a first acute angle (α) with straight line (D) perpendicular to direction of advance (A) and second acute angles (β) with axes (38 and 39) of carrying wheels (36 and 37). These angles (α and β) have approximately the same value. This is about 12°. Thanks to these identical values, the lateral position of the machine relative to the tractor does not vary during transposition from the first to the second position and vice versa.

The inclined position of cutting device (50) and conditioning and throwing device (54) is obtained by a movement of frame (1) which brings them around hinge pin (7) with tongue (6). For this purpose, it is necessary to actuate hydraulic cylinder (9). The latter shoves frame (1) backward and causes a sliding of rod (13) in slide (14) of device (12) which makes it possible to define the position of frame (1). This sliding takes place until slide bolt (24) of lock (15) comes to strike against the other end of oblong orifice (17) in rod (13). At this moment, frame (1) is locked in the second position.

The movement of axes (38 and 39) of carrying wheels (36 and 37) of frame (1) is obtained by hydraulic cylinders (42 and 43). When the latter are extended, they make outside pivots (30 and 31) of arms (26 and 27) pivot with the wheels (36 and 37) around their hinge pins (32 and 33). These same cylinders (42 and 43) can assure locking of wheels (36 and 37) in the different positions.

In this second work position, deflectors (74 and 75) are oriented toward the left side of the machine—viewed in direction of advance (A). For this purpose, they are moved around their hinge pins (76 and 77). This movement is assured by a hydraulic cylinder (79) which shoves rod (78) toward the same left side. This cylinder (79) also locks deflectors (74 and 75) in the different positions.

For greater convenience, the movements of frame (1), carrying wheels (36 and 37) and deflectors (74 and 75) occur at the same time.

In this second work position, tractor (8) straddles the windrow deposited during the preceding passage. The cut and conditioned crop is completely picked up by throwing rotor (56). The latter accelerates the crop and throws it in an oblique direction relative to direction of advance (A). Thanks to this oblique direction, the distance over which the crop is thrown can be rather great. This crop, which, in addition, is gathered by deflectors (74 and 75), then falls on the ground on the left side of the machine and preferably beside the windrow formed during the preceding passage. The crop cut in two successive passages is found practically on a single windrow to be able to be gathered with the most widely used pick-ups.

During this movement of the crop to the left, throwing rotor (56) and deflectors (74 and 75) clear a wide enough space for the passage of the tractor during the following turn, for which the machine is brought into the position designated as being the first work position. This transposition is performed again by operating the different hydraulic cylinders (9, 42, 43 and 79) which simultaneously move frame (1), carrying wheels (36 and 37) and deflectors (74 and 75).

The machine according to the invention can also be transposed into a transport position (not represented) in which it is aligned with tractor (8). For this purpose, it is necessary to raise frame (1) of the machine with hydraulic cylinders (40 and 41), remove sliding bolt (24) of lock (15) from oblong orifice (17) by cable (23) and operate cylinder (9) to bring frame (1) of the machine to tongue (6). Axes (38 and 39) of wheels (36 and 37) are then parallel to frame (1). When the machine is drawn, wheels (36 and 37) place themselves in the direction of advance and make the entire machine pivot around its point of hitching to tractor (8) until it is located behind the latter. In this position, sliding bolt (24) of lock (15) engages in hole (18) provided in rod (13) under the traction effect of spring (25). Said sliding bolt then locks the machine in the transport position. To come back to the work position, it suffices to unlock rod (13) and to operate cylinder (9) in the opposite direction.

It is obvious that the invention is not limited to the embodiment as described and represented on the accompanying drawings. Modifications remain possible, particularly from the viewpoint of the makeup of different elements or by substitution of technical equivalents, without thereby going outside the field of protection. For example, it will be possible to replace the flail rotor by pressing rollers or even eliminate the conditioning function between the cutting bar and throwing rotor.

What is new and desired to be secured by Letters Patent of the United States is:

1. An agricultural machine for harvesting crop, which is pulled by a tractor in a direction of advance and projects laterally beyond said tractor during work, said machine comprising:
   a frame provided with tongue means for hitching said machine to said tractor, said tongue means being pivotally mounted on the frame;
   ground engaging wheels on which said frame is mounted for carrying said machine;
   arms on which said wheels are mounted, said arms having pivots carrying said wheels and which are pivoted to substantially vertical pins;
   cutting means, and conditioning and throwing means, mounted on said frame;
   adjustable deflector means disposed at a rear side of said frame; and
   transposition means, for positively moving said machine from a first work position in which the cutting means and the conditioning and throwing means are disposed substantially perpendicular to the direction of advance to a second work position in which the cutting means and the conditioning and throwing means form a first acute angle with a straight line perpendicular to the direction of advance and second acute angles with the axes of said ground engaging wheels, the second angles having substantially the same value as the first angle;
   wherein said transposition means comprises:
   a first hydraulic cylinder means disposed between said frame and said tongue means and a pair of second hydraulic cylinder means, each of said second hydraulic cylinder means being disposed between said frame and one of said wheels;
   an adjusting cylinder means disposed between said frame and said deflector means; and
   means for causing said transposition means to act simultaneously.

2. Agricultural machine according to claim 1, wherein:
   the value of said first and second angles is about 12°.

3. Agricultural machine according to claim 1, wherein:
   said second hydraulic cylinders act on said arms and said pivots so that the pivots can be moved by said second hydraulic cylinders.

4. Agricultural machine according to claim 1, wherein each of said second hydraulic cylinder means comprises a rod connected to a tip, said rod acting on said tip so that the length of said rod can be adjusted.

5. Agricultural machine according to claim 1, wherein a position definition device is pivoted to said tongue means and said frame through first hinge pins while said first hydraulic cylinder means is pivoted to said tongue means and said frame through second hinge pins, said first and second hinge pins being aligned.

6. Agricultural machine according to claim 3, including a rod connecting together said deflector means, said adjustment cylinder means being connected to said rod and to a cap connected to said frame.

7. Agricultural machine according to claim 1, wherein said conditioning and throwing means comprises: a conditioning rotor and a substantially horizontal throwing rotor extending substantially over the entire width of said cutting means.

8. Agricultural machine according to claim 7, wherein said throwing rotor is located immediately behind said conditioning rotor.

9. Agricultural machine according to claim 7 or 11, wherein said conditioning rotor and said throwing rotor are disposed parallel to each other.

10. Agricultural machine according to claim 7, wherein said conditioning rotor and said throwing rotor are driven in the same direction of rotation.

11. Agricultural machine according to claim 7, wherein said throwing rotor includes peripheral teeth which are slightly curved in the direction opposite the direction of rotation thereof.

12. Agricultural machine according to claim 11, wherein said peripheral teeth of said throwing rotor penetrate partially into the path of flails of said conditioning rotor.

13. Agricultural machine according to claim 7, wherein the speed of rotation of said throwing rotor is greater than that of said conditioning rotor.

* * * * *

UNITED STATES PATENT AND TRADEMARK OFFICE
CERTIFICATE OF CORRECTION

PATENT NO. : 4,991,383

DATED : February 12, 1991

INVENTOR(S) : Rino Ermacora

It is certified that error appears in the above-identified patent and that said Letters Patent is hereby corrected as shown below:  Title page:

Item 19, and 75:

The inventor's name is incorrect, should be, --Rino Ermacora-- and the priority data is incorrect, should be, --March 4, 1988 [FR] France....................88 02999--.

Signed and Sealed this

Second Day of March, 1993

Attest:

STEPHEN G. KUNIN

*Attesting Officer*    *Acting Commissioner of Patents and Trademarks*